(12) United States Patent
Garrett

(10) Patent No.: US 7,093,908 B2
(45) Date of Patent: Aug. 22, 2006

(54) TIRE AND WHEEL SHIELD

(76) Inventor: Thomas Garrett, 240 Hwy. 328, Oxford, MS (US) 38655

( * ) Notice: Subject to any disclaimer, the term of this patent is extended or adjusted under 35 U.S.C. 154(b) by 36 days.

(21) Appl. No.: 10/855,215

(22) Filed: May 27, 2004

(65) Prior Publication Data

US 2005/0264092 A1    Dec. 1, 2005

(51) Int. Cl.
*B60B 7/00* (2006.01)

(52) U.S. Cl. .............. 301/37.103; 301/37.104; 301/37.42

(58) Field of Classification Search ........... 301/37.103, 301/37.104, 37.105, 37.42; 206/303, 304.1, 206/304.2; 280/842, 767, 250; 118/504, 118/505

See application file for complete search history.

(56) References Cited

U.S. PATENT DOCUMENTS

| | | | | |
|---|---|---|---|---|
| 20,498 A | * | 6/1858 | Lyon | 431/248 |
| 82,028 A | * | 9/1868 | Hansen et al. | 73/428 |
| 1,557,943 A | * | 10/1925 | Musto | 206/304.1 |
| 1,849,013 A | * | 3/1932 | Lyon | 206/304.2 |
| 1,991,207 A | * | 2/1935 | Hartel | 206/304.2 |
| 2,019,988 A | * | 11/1935 | Lyon | 206/304.2 |
| 2,056,839 A | * | 10/1936 | Fergueson et al. | 206/304.2 |
| 2,231,333 A | * | 2/1941 | Gunn | 118/505 |
| 2,747,639 A | * | 5/1956 | Mertz | 152/173 |
| 2,849,045 A | * | 8/1958 | Anderson | 206/304.1 |
| 3,770,035 A | * | 11/1973 | Haye, Sr. | 206/304.1 |
| 4,190,939 A | * | 3/1980 | Keller | 29/451 |
| 4,787,331 A | * | 11/1988 | Jarvis | 118/504 |

FOREIGN PATENT DOCUMENTS

FR    2204515 A    *   6/1974

* cited by examiner

*Primary Examiner*—Frantz F. Jules
(74) *Attorney, Agent, or Firm*—Timothy M. Barlow

(57) ABSTRACT

A freestanding automotive tire and wheel cover comprises a shell that is open against the ground and inside the wheel well adjacent to an interior sidewall of a tire. The bottom edge of the shell rests on the ground. The shell protects the outer sidewall and tread from ultraviolet radiation, weather and other damaging elements. The shell may include corner braces or a flared section for extra rigidity and support, or a separate base member may be attached to the shell for the same purpose. A retention strap is secured to the shell by buckles or snaps. An inner wheel shroud provides extra security is attaching to the tire and wheel and protects most of the interior side of the tire and wheel. The shells may be tapered to permit multiple shells to nest together and a planar sidewall cover permits attachment of a decal.

7 Claims, 3 Drawing Sheets

TIRE AND WHEEL SHIELD

BACKGROUND OF THE INVENTION

1. Field of the Invention

The present invention relates generally to tire and wheel covers, and more specifically to a semi-rigid, freestanding tire and wheel cover for automotive use.

2. Description of Related Art

Tires and wheels are subject to extreme use and abuse, both on the road and while stationary, whether simply parked or in storage. It is obvious that tires will eventually wear out from driving on them, but what many do not know is that tires can be destroyed simply through exposure to the elements, even if the vehicle is not driven. One of the main culprits in the stationary destruction of tires is ultraviolet radiation (UV) from the sun.

UV radiation acts to degrade the compounds that make up tires. Over time, the tire loses its resiliency and flexibility. Such damaged tires are not capable of performing at the maximum pressure, temperature or load limitations printed on the tire. They are subject to sudden failure while approaching those limitations. In extreme cases the tire may fail before it is used on the road. In less extreme cases, only the tire's appearance is adversely affected from prolonged storage or exposure to the elements. Thus what is needed is a tire and wheel shield that protects a vehicle's tires and wheels from the elements.

Mobile homes, recreational vehicles, trailers and specialty or collector's cars often sit idly for weeks, months or years. Ultimately, these vehicles will be driven, and their appearance matters, quite often more than their performance. Car covers are commonly available to protect the vehicles' paint finish and interior, but tires are often neglected.

One reason for this neglect may be the difficulty in keeping tire covers in place for prolonged periods. When a vehicle is stored outdoors, unsecured wheel covers may become displaced or blow away in windy conditions. What is needed is a tire and wheel cover that can be removably attached to a tire and wheel, that cannot be displaced by high winds, and that can be removed quickly and easily without damaging the vehicle, tire or wheel.

Through the years, other tire and wheel protection covers have been developed. These covers have had several shortcomings, including difficulties in installation and storage. Many of the early covers are soft fabric covers that were simply draped or wrapped around a tire and wheel. Their lack of rigidity made installation a difficult chore. These covers would collapse during the installation process. In an effort to reduce costs, some of these covers were extremely thin. Extra reinforcing is needed for them to support themselves. What is needed is a tire and wheel cover that can support itself to simplify the installation process.

When tire and wheel covers are not in use, they need to be stored in a place and manner that will not damage them. Individual self-standing tire and wheel covers can take up a lot of space. What is needed is a tire and wheel cover that can be nested with other tire and wheel covers to save space and minimize damage to the tire and wheel covers.

Thus what is needed is a device that covers and protects tires and wheels from harmful UV radiation, animals and the elements. The device should be capable of standing upright without assistance and installation should be quick and easy, without tools, making it suitable for use for stored or frequently-driven vehicles.

SUMMARY OF THE INVENTION

The device is a freestanding tire and wheel cover for automotive use. The tire and wheel cover protects automotive tires and wheels from damage due to UV radiation, weather and animals. The tire and wheel covers are fabricated from a strong, flexible synthetic material that is impervious to UV radiation and the elements. Any metal parts, such as metal snaps, are rust-resistant or rust-proof. The retention straps are impervious to UV radiation, rotting and the elements. The tire and wheel cover may be manufactured in a few different sizes to accommodate virtually any tire and wheel height and width. The tire and wheel covers are freestanding to simplify their ease of use and installation. Retention straps with snaps, buckles or both hold the tire and wheel covers in place through high winds and severe weather while the vehicle is temporarily parked or in long-term storage. The tire and wheel cover may be used by automotive paint and body shops to protect tires and wheels from dust, dirt and overspray. The tire and wheel covers may be use in conjunction with other auto or truck covers to provide more complete, thorough protection for the vehicle. The tire and wheel covers also nest together to simplify storage and they provide a suitable surface for affixing decals, decorations or painting designs.

Accordingly, it is a principal object of the invention to provide a device for protecting tires and wheels from UV radiation and weather hazards.

It is another object of the invention to teach a device that is capable of standing freely without the need for straps or clips.

It is a further object of the invention to provide a device that can be attached to a wheel and tire assembly to prevent being displaced by weather, the elements or other forces.

It is another object of the invention to teach a device that includes a shroud to more thoroughly protect the interior side of a tire and wheel and which further prevents the tire and wheel cover from becoming displaced.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

DETAILED DESCRIPTION OF THE DRAWINGS

The present invention is a freestanding tire and wheel cover for automotive use, comprising a shell that envelopes a wheel and tire on a stationary automobile. The tire and wheel cover protects the tire and wheel from damage.

Figure 1:
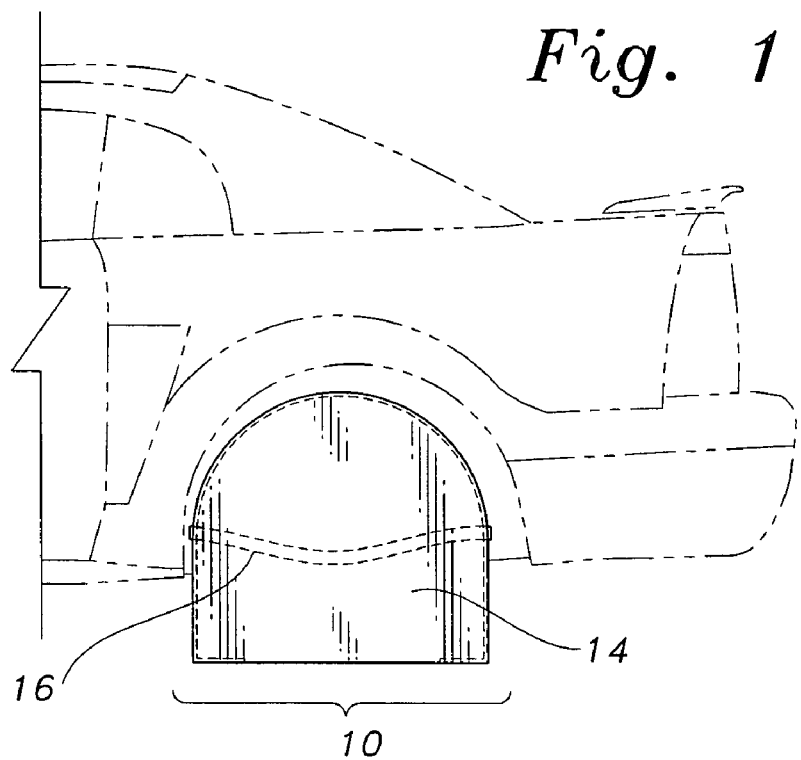
FIG. 1 is a side view of a tire and wheel cover attached to an automobile according to the present invention.

As show in FIG. 1, the tire and wheel cover includes a shell 10 that is has an inverted-U tread cover panel 12 and an outer sidewall cover panel 14. The shell 10 may be formed as a single piece, or assembled from the tread cover panel 12 and the sidewall cover panel 14 to create a complete shell 10. The shell 10 is open against the ground and along a vertical plane inside the automobile's wheel well adjacent to an interior sidewall of a tire. The volume within the shell 10 is at least as big as a tire and wheel. The bottom edge of the shell 10 rests on the ground adjacent to the tire and the shell 10 protects the outer sidewall and tread of the tire from ultraviolet (UV) radiation, weather and other damaging elements. The shell 10 is freestanding and needs no retention mechanism to remain in position around a tire and wheel under all but the most extreme conditions. The shell 10 may be made from, or coated with, a UV-resistant material to provide long life for both the shells and the tires and wheels.

Figure 2:
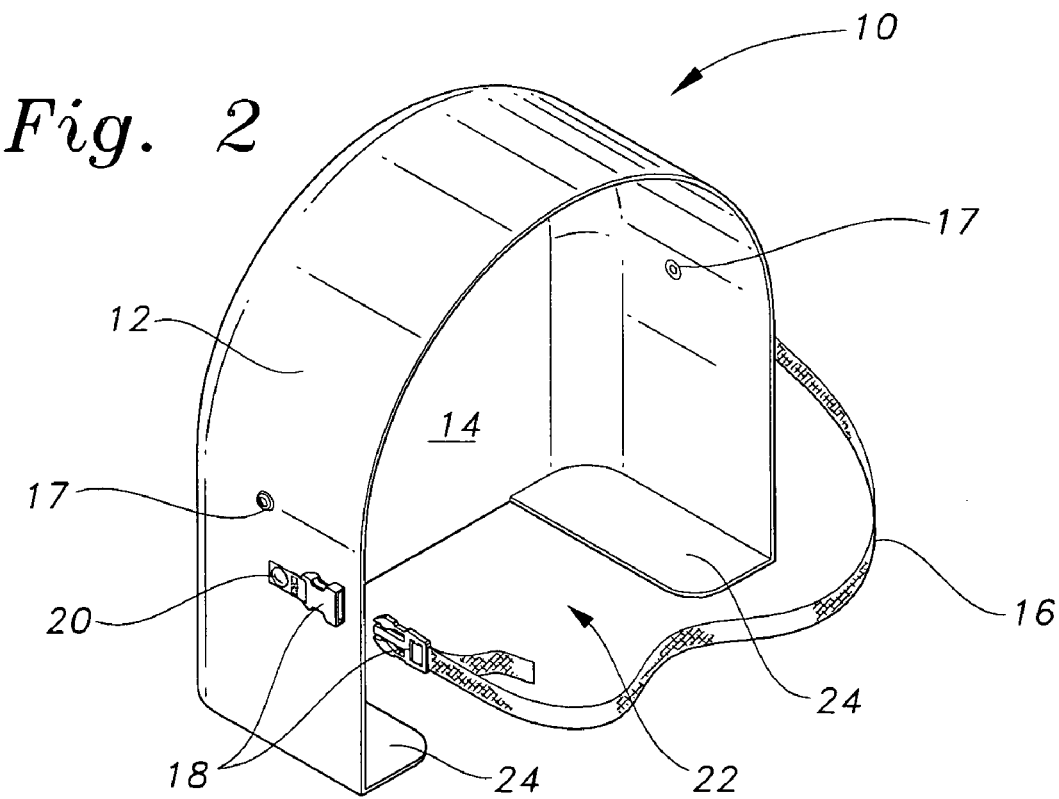
FIG. 2 is a perspective view of a tire and wheel cover with corner braces according to the present invention.
Figure 3:
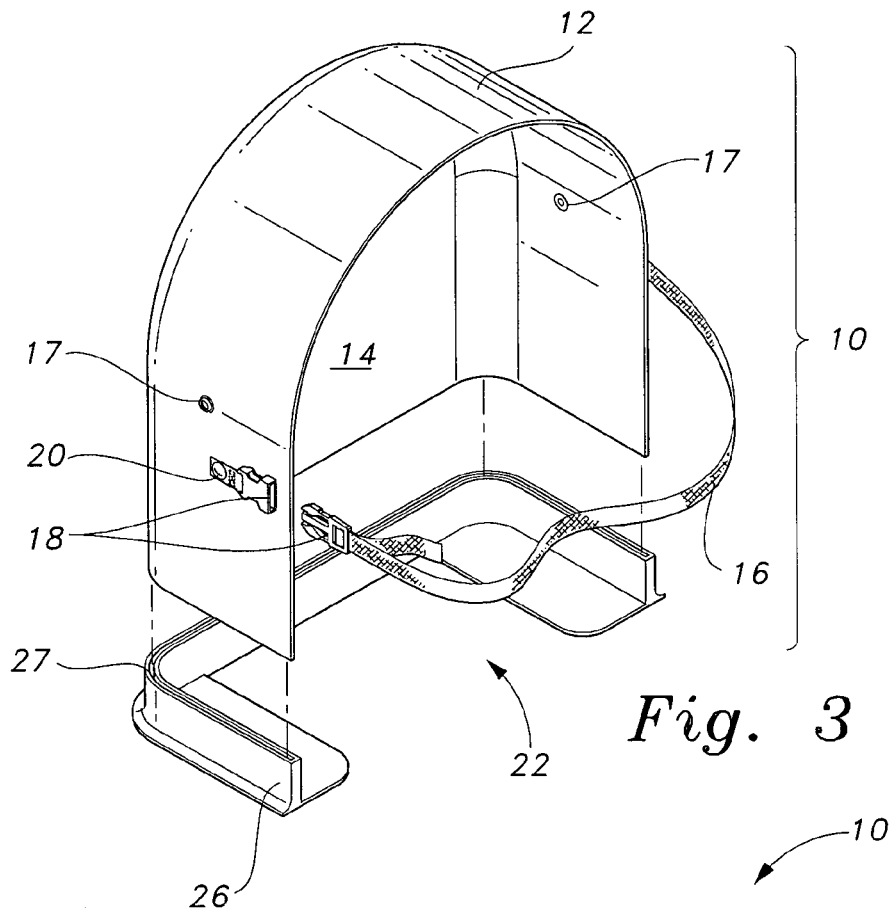
FIG. 3 is a perspective view of a tire and wheel cover with a receptacle base member according to the present invention.
Figure 4:
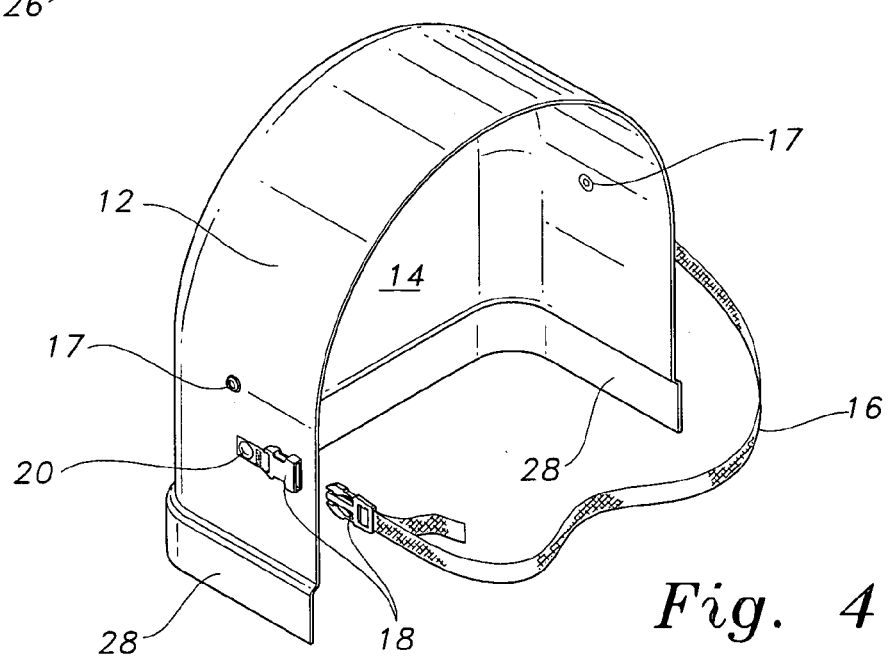
FIG. 4 is a perspective view of a tire and wheel cover with a flared section according to the present invention.

FIGS. 2–4 show several variations of the tire and wheel cover. In one embodiment, the shell 10 further includes an adjustable, detachable retention strap 16. The retention strap 16 is attached to the shell 10 at two points 17 on the exterior of the tread cover panel 12. The attachment points 17 are located at approximately half the height of the shell 10 to maximize the effectiveness of the retention strap 16 when it is necessary. The strap 16 is attached to the attachment points 17 across the open interior side 22 of the shell 10, and the shell 10 is held against the wheel and tire by the strap 16. In one embodiment, the retention strap 16 further includes a buckle 18. In another embodiment, the retention strap 16 further includes quick-release snap mechanism 20. The retention strap 16 may also include both a buckle 18 and a snap mechanism 20.

In one embodiment, the freestanding automotive tire and wheel cover further includes a pair of corner braces 24. See FIG. 2. The corner braces 24 improve the rigidity and the freestanding ability of the tire and wheel cover. The corner braces 24 are attached to the two ends of the tread cover panel 12 and the lower edge of the sidewall cover panel 14 and oriented in a horizontal plane. The corner braces 24 may be integrally formed with the entire shell 10 or from elongated ends of the tread cover panel 12 folded inward toward each other across the open bottom of the shell 10. The corner braces 24 must occupy some space within the shell interior 22 in order to be effective, but the corner braces 24 should extend no further than approximately one-third of the width of the sidewall cover panel 14 each. This size permits only enough space between the corner braces 24 for the contact patch of the tire enveloped within the shell 10.

In another embodiment, the tire and wheel cover includes a receptacle base member 26. See FIG. 3. The receptacle base member 26 improves the rigidity and the freestanding ability of the tire and wheel cover. The receptacle base member 26 is a horizontally-oriented U-shaped brace that matches the general shape of the bottom end of the shell 10. The receptacle base member 26 includes a vertically-oriented slot 27 to engage the bottom end of the shell 10. The shell 10 is inserted into the vertical slot 27 to improve the rigidity and freestanding properties of the tire and wheel cover. Similar to the corner braces 24 of FIG. 2, the base member 26 provides sufficient space for the tire to contact the ground and for the assembled tire and wheel cover, shell 10 plus base member 26, to be placed into position around a tire and wheel. The receptacle base member 26 may be separated from the shell 10 for easier storage of the tire and wheel cover.

In another embodiment, the tire and wheel cover includes a flared section 28. See FIG. 4. The flared section 28 improves the rigidity and the freestanding ability of the tire and wheel cover. The flared section 28 flares outward slightly adjacent to the bottom edge of the shell 10. The flared section 28 offers the advantages of maximum space for the shell interior 22, with extra rigidity for the entire shell 10.

Figure 5:
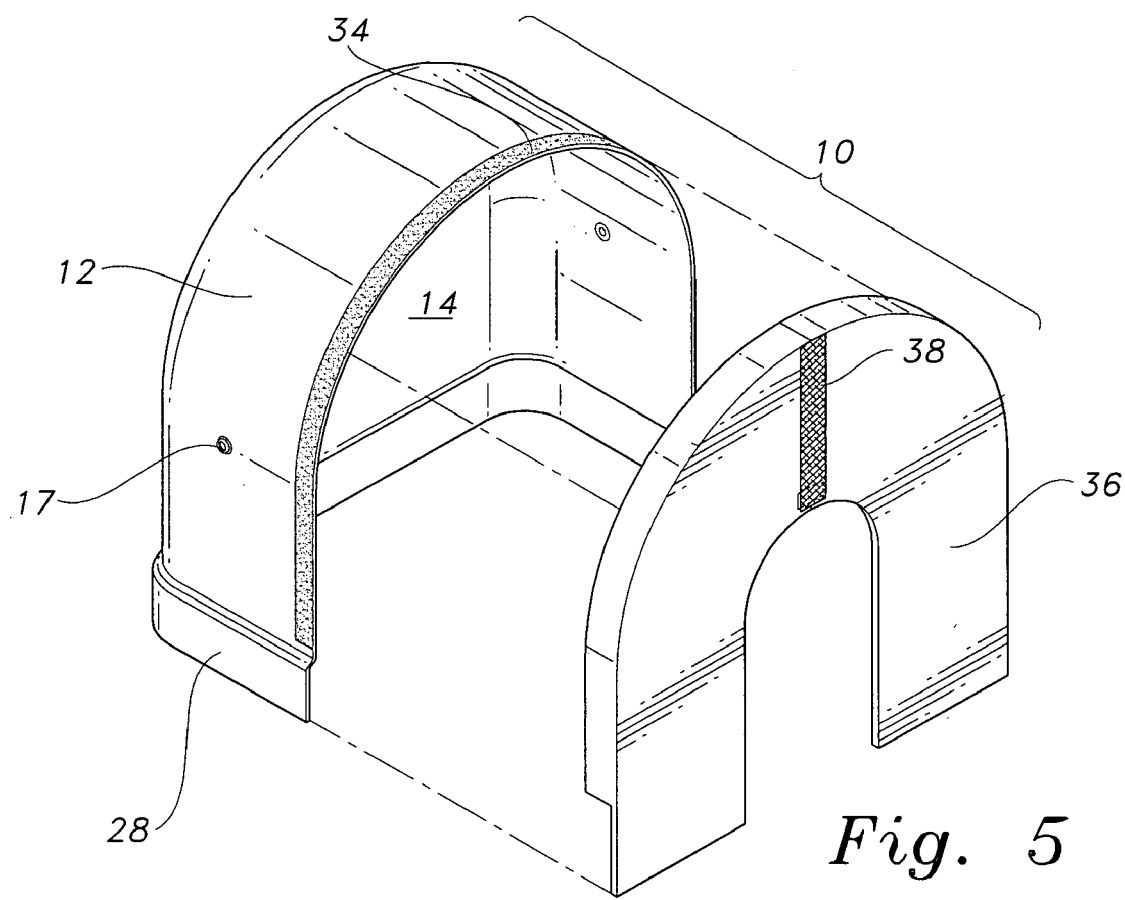
FIG. 5 is a perspective view of a tire and wheel cover with an inner wheel shroud according to the present invention.

In another embodiment, the tire and wheel cover includes an inner wheel shroud 32. See FIG. 5. The inner wheel shroud 32 permits the tire and wheel cover to protect virtually the entire tire and wheel. The inner wheel shroud 32 also provides an extra measure of security for the tire and wheel cover by holding the tire and wheel cover more closely to the tire and wheel. The inner wheel shroud 32 is a flexible sheet of material removably attached to the shell 10. The inner wheel shroud 32 may be attached with hook and loop material 34, a plurality of snaps (not shown) or other similar methods. The inner wheel shroud 32 is attached to the shell 10 across the open, interior side of the shell 10, corresponding to the interior of an automobile wheel well. The inner wheel shroud 32 includes a keyhole slot 36 extending up from the bottom edge of the inner wheel shroud 32 to its approximate center. The keyhole slot 36 provides sufficient clearance for the automobile's axle to pass through the inner wheel shroud 32. The inner wheel shroud 32 is shown with a shell 10 having a flared section 28, but the inner wheel shroud 32 may be properly used with any of the shell 10 variations. In another embodiment, the inner wheel shroud 32 is made of two or more pieces to simplify the mounting process. FIG. 5 shows a two-piece inner wheel shroud 32 with an overlap area 38 joined with hook and loop material.

Figure 6:
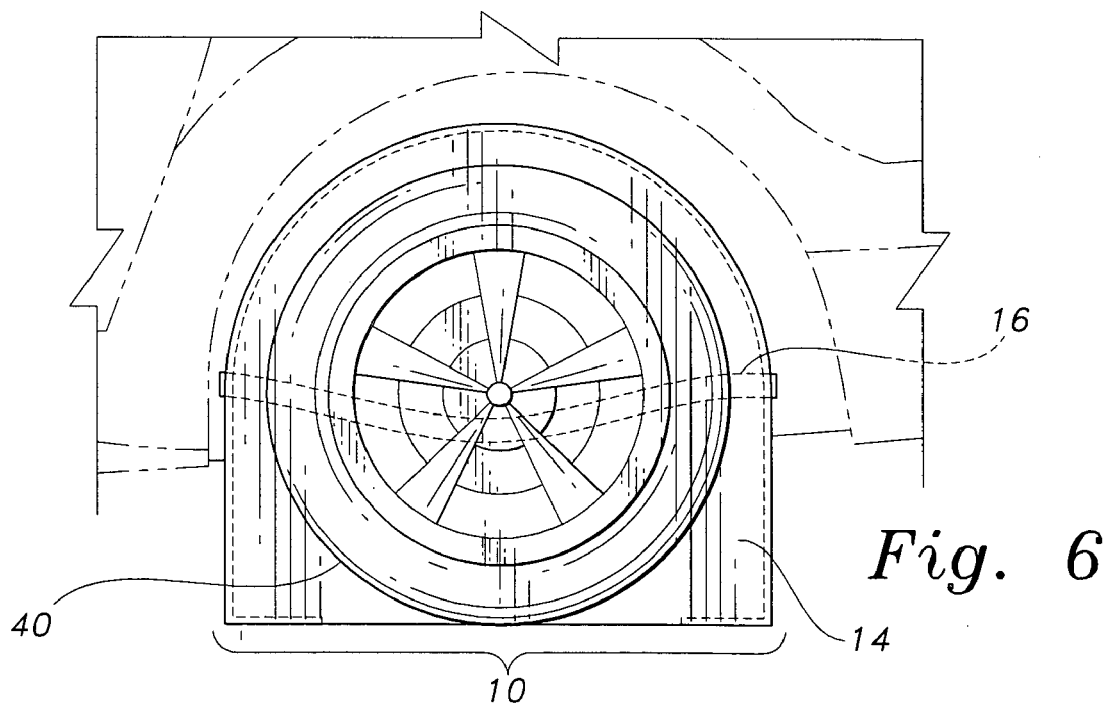
FIG. 6 is a side view of a tire and wheel cover with a wheel decal according to the present invention.

The sidewall cover panel 14 is a generally planar component of the shell 10. The planar nature of the sidewall cover panel 14 makes it a suitable attachment point for a decal 40. FIG. 6 shows a decal 40 fixed to the sidewall cover panel 14. In this instance, the decal 40 approximates the circumference of the wheel and tire, providing the illusion that the decal 40 is the actual wheel and tire of the automobile.

In another embodiment, a plurality of tire and wheel covers may be nested together. To make nesting possible, the width of the shell 10 measured across the surface of the sidewall cover panel 14 is less than the width of the shell 10 measured between across the open edges of the tread cover panel 12 furthest away from the sidewall cover panel 14. The different measurements provide a tapered shape to the shell 10, thus the tapered shells can be nested together. Nested tire and wheel covers are far more simple to store and less likely to suffer damage due to the mutual protection offered by the group. The nested tire and wheel covers may be held together with a retention strap 16 attached to the outermost nested tire and wheel cover and across the open side of the inner nested tire and wheel covers.

It is to be understood that the present invention is not limited to the sole embodiments described above, but encompasses any and all embodiments within the scope of the following claims.

Part # Part Name
10 shell
12 tread cover panel
14 outer sidewall cover panel
16 retention strap
17 strap attachment points
18 buckle 20 snap
22 shell interior
24 corner braces
26 receptacle base member
27 vertical slot
28 flared section
30 planar surface for decal
32 inner wheel shroud
34 hook and loop material
36 keyhole slot
38 overlap area
40 decal

The invention claimed is:

1. A freestanding automotive tire and wheel cover comprising:
   a shell, the shell comprising an inverted-U tread cover panel fixed to an outer sidewall cover panel; and
   an adjustable, detachable retention strap attached at two points to the inverted-U tread cover panel portion of the shell, the attachment points being approximately half the height of the shell, the strap attached across an open interior side of the shell, and the shell is held against the wheel and tire by the strap, wherein the shell is open against the ground and along a vertical plane inside an automobile wheel well adjacent to an interior sidewall of a tire, wherein a bottom edge of the shell rests on the ground adjacent to the tire and the shell protects an outer sidewall and tread of the tire from ultraviolet radiation, weather and other damaging elements.

2. The freestanding automotive tire and wheel cover of claim 1, wherein the retention strap further comprises a buckle.

3. The freestanding automotive tire and wheel cover of claim 1, wherein the retention strap further comprises a quick-release snap mechanism.

4. The freestanding automotive tire and wheel cover of claim 1, wherein the sidewall panel and the tread cover panel of the shell comprises a flared section, the flared section flaring outward slightly adjacent to the bottom edge of the shell, wherein the flared section improves the rigidity and freestanding properties of the tire and wheel cover.

5. The freestanding automotive tire and wheel cover of claim 1, wherein the sidewall cover panel further comprises a planar surface suitable for affixing a decorative decal, the decorative decal approximating the circumference of the wheel and tire.

6. The freestanding automotive tire and wheel cover of claim 1, further comprising a receptacle base member, the receptacle base member being removably attached to the shell, the receptacle base member comprising a vertically-oriented slot to engage a bottom end of the shell, the base member improving the rigidity and freestanding properties of the tire and wheel cover, and the base member providing sufficient space between the ends of the inverted-U tread cover panel for the tire to contact the ground and for the tire and wheel cover to be placed into position around a tire and wheel.

7. The freestanding automotive tire and wheel cover of claim 1, further comprising a flexible inner wheel shroud, the inner wheel shroud being removably attached to the shell across the open vertical plane corresponding to the interior of an automobile wheel well, the inner wheel shroud comprising a keyhole slot extending up from the bottom edge of the inner wheel shroud to the approximate center of the inner wheel shroud, the keyhole slot being sufficient for an automobile axle to pass through the inner wheel shroud, the assembly of the inner wheel shroud and the tire and wheel protecting the exposed surfaces of the wheel and tire.

* * * * *